Oct. 16, 1934.  C. T. PFLUEGER  1,977,141
ARTIFICIAL BAIT
Filed Nov. 27, 1929

INVENTOR
CHARLES T. PFLUEGER
BY
Ely & Barrow
ATTORNEYS

Patented Oct. 16, 1934

1,977,141

UNITED STATES PATENT OFFICE 1,977,141

ARTIFICIAL BAIT

Charles T. Pflueger, Akron, Ohio, assignor to The Enterprise Manufacturing Company, Akron, Ohio, a corporation of Ohio Application November 27, 1929, Serial No. 410,041

9 Claims. (Cl. 43—46)

The present invention relates to the manufacture of artificial bait, and particularly to the construction of wooden minnows having certain advantages and improvements over previous artificial baits.

One of the objects of the invention is to construct an artificial minnow of the type provided with a metal head or sinker on the forward end thereof to which the hook-carrying member at the rear of the bait is connected by a connection extending through the body of the bait, so that all of the strain is taken off of the wooden body and a direct connection is provided from the line to the rear hook, all strain being removed from the body.

It is a further object of the invention to provide a combined socket member for limiting the angular movement of the rear hook with a reinforcing collar or ferrule which will prevent the member by which the hook is attached to the body from breaking the wood of the body.

It is a further object of the invention to improve upon the construction of the weighted head so that it will be properly located with respect to the body and will not rotate thereon.

Other objects and advantages will be gained by the improved construction illustrated and described herein, but it will be understood that the invention is not necessarily limited to exact conformity with the detailed description and drawing, as the invention may be embodied in other forms than that disclosed.

In the drawing in which the preferred form of the device is illustrated;

Figure 1:
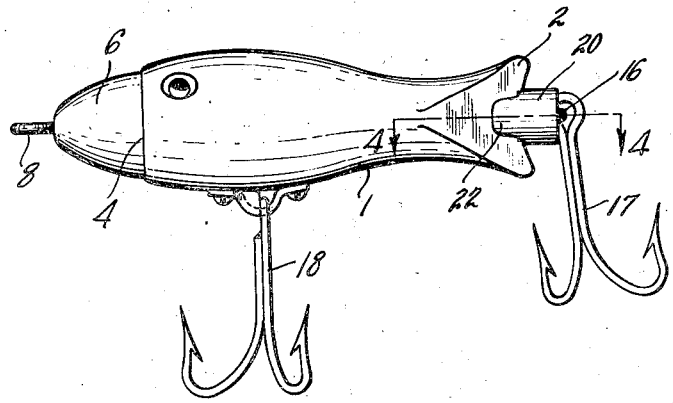
Figure 1 is a side view of the improved artificial minnow.
Figure 2:
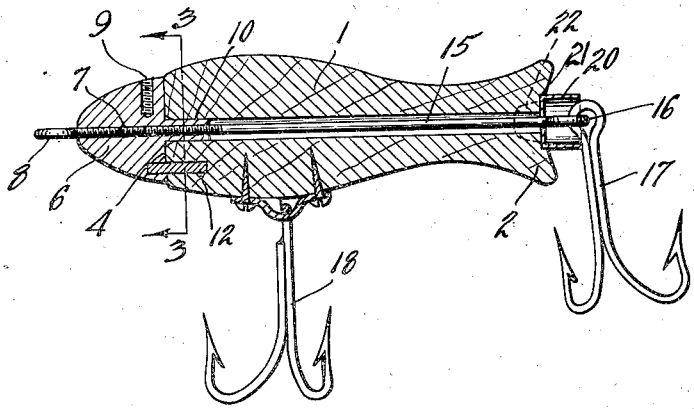
Figure 2 is a longitudinal central section thereof.
Figure 3:
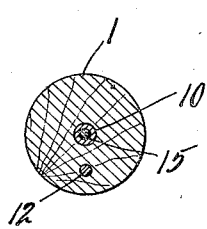
Figure 3 is a cross section on the line 3—3 of Figure 2.
Figure 4:
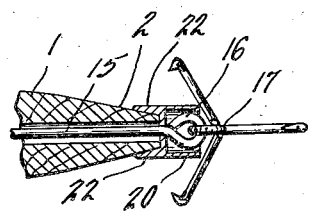
Figure 4 is a cross section on the line 4—4 of Figure 1.

The artificial bait comprises a body portion 1, which is made of wood or other buoyant material and is in the form of a minnow body having a flattened tail portion 2. The body may be painted to imitate a fish and be provided with the usual eyes. The forward end of the body is cut away to provide a squared end 4 against which is fitted the flat side of a rounded tapering metal head 6 providing the required weight for the head portion, this particular bait being intended primarily for salt water fishing where considerable depth is attained.

The head is provided with the centrally arranged axial screw-threaded passage 7 in the forward end of which is receivable the eye 8 for attachment to the line. A secondary screw-threaded socket 9 may also be provided in the head to which the screw eye may be transferred if it is desired to attach the line thereto, whereby a different action may be given to the bait.

On the rear face of the head is located the central boss or stud 10 through which the passage 7 is extended and at one side thereof is carried a secondary stud 12 which serves to locate the head in its proper position and to prevent rotation of the head. The body is provided with the sockets to receive the studs 10 and 12.

Passing through the axis of the body is the removable shaft or pin 15, the forward end of which is screw-threaded for reception in the stud 10. At the rear the shaft passes out of the body at the point where the tail is formed and is provided with an eye or loop 16 to which the rear hook 17 is attached. A second hook 18 may, if desired, be secured to the underside or belly of the bait.

It will be observed that there is a direct connection between the head and the rear hook so that the latter is not attached to or carried by the body, a construction which takes all of the strain of the line and rear hook off the body.

It will also be observed that the shaft passes out of the wooden body where the wood is comparatively thin in transverse section and can be easily broken by a sidewise strain upon the hook. In order to reinforce the wood at this point and also to provide a means for restricting or limiting the angular movement of the rear hook a combined socket and ferrule is provided.

This member which is indicated at 20 consists of a cup, the flange of which projects outwardly about the eye 16 so as to prevent the hook from cocking on the eye or swinging forwardly to such a position as to become entangled with the line or with the hook 18. The cup is seated in a recess 21 in the end of the body which keeps the cup and shaft in their proper positions.

Extending from the cup on opposite sides thereof and lying against the surface of the minnow body at the tail are the two wings or lugs 22 which are tapered in cross section to fit against the body and which hold the wood at this point so that the shaft will not break through. The member 20 therefore combines in a single structure, a reinforcement for the body and a limiting element for the hook.

It will be understood that changes and modifications may be made in various embodiments of the invention which it is intended to cover by the appended claims.

What is claimed is:

1. In an artificial bait, a body, a shaft extending through the body, a metal head located against the front of the body and having a screw-threaded connection with the shaft, and a hook on the rear of the shaft.

2. In an artificial bait, a body, a rounded tapering head fitting against the forward end of the body, a shaft extending axially of the body and having a screw-threaded connection with the head, and a connection on the head for the line.

3. In an artificial minnow, the combination with a body having an axial bore and a flattened tail portion, a shaft extending through the axial bore and through the tail portion, and a metal reinforcement for the body at the point where the shaft protrudes from the flattened tail portion said reinforcement supporting the rear end of the shaft centrally of the axial bore.

4. In an artificial minnow, the combination with a wooden body having a flaring, flattened tail portion, a pin extending rearwardly from the body and having a hook secured thereon, and a metal reinforcement on the pin having forwardly extending wings lying along the flattened tail portion of the body.

5. In an artificial minnow, the combination with a wooden body having a flaring, flattened tail portion, a pin extending rearwardly from the body and having a hook secured thereon, a metal reinforcement on the pin having forwardly extending wings lying along the flattened tail portion of the body, and a rearwardly extending socket operating to limit the angular movement of the hook.

6. In an artificial minnow, the combination with a wooden body having a flaring, flattened tail portion, a pin extending through the body and having a screw-threaded forward end and an eye on the rear end thereof, a metal head on the forward end of the body engaging the forward end of the pin, an eye on the rear end of the pin, a hook mounted in the eye, a ferrule on the rear end of the pin having a flange surrounding the eye, and forwardly extending wings lying against the side of the body.

7. In an artificial minnow, the combination with a wooden body having a flaring, flattened tail portion, a pin extending through the body and having a screw-threaded forward end and an eye on the rear end thereof, a metal head on the forward end of the body, a stud on the head having a socket to receive the end of the pin, means to prevent the head from being rotated on the body, an eye on the rear end of the pin, a hook mounted in the eye, a ferrule on the rear end of the pin having a flange surrounding the eye, and forwardly extending wings lying against the side of the body.

8. In an artificial bait, a body, a rounded tapering head fitting against the forward end of the body, a shaft extending axially of the body and threaded into the head and constituting a rigid connection therebetween adapted to draw the head against the body, and a connection on the head for the line.

9. In an artificial bait, a body formed with a longitudinal bore, a head fitting against the forward end of said body and formed with a stud extending into the bore of the body, a shaft extending through the bore of the body and threaded into the said stud and constituting a rigid connection between body and head, and a connection on the head for a line.

CHARLES T. PFLUEGER.